USOO5680475A

United States Patent [19]
Zwierski et al.

[11] Patent Number: 5,680,475
[45] Date of Patent: Oct. 21, 1997

[54] SYSTEM FOR PROCESSING TEXTURED IMAGES, TEXTURE ANALYSER AND TEXTURE SYNTHESIZER

[75] Inventors: Didier Zwierski, Saint Maur; Jean-Pierre Nadal, Paris; Jacques Sirat, Versailles, all of France

[73] Assignee: U.S. Philips Corporation, New York, N.Y.

[21] Appl. No.: 425,674

[22] Filed: Apr. 18, 1995

Related U.S. Application Data

[63] Continuation of Ser. No. 121,655, Sep. 14, 1993, abandoned.

[30] Foreign Application Priority Data

Sep. 16, 1992 [FR] France ................... 92 11044

[51] Int. Cl.$^6$ ........................................ G06K 00/00
[52] U.S. Cl. ............................... 382/156; 382/232
[58] Field of Search ............................. 382/108, 156, 382/232, 240, 251; 358/448, 458, 467

[56] References Cited

U.S. PATENT DOCUMENTS

| 4,897,881 | 1/1990 | Ledinh et al. ............... 382/28 |
| 5,003,490 | 3/1991 | Castelaz et al. ............ 382/15 |
| 5,005,206 | 4/1991 | Naillon et al. .............. 382/15 |
| 5,134,396 | 7/1992 | Sirat et al. .................. 341/51 |
| 5,214,507 | 5/1993 | Aravind et al. ............ 382/56 |
| 5,218,646 | 6/1993 | Sirat et al. .................. 382/14 |

FOREIGN PATENT DOCUMENTS 0446084   9/1991   European Pat. Off. ........ G06F 15/80

OTHER PUBLICATIONS

Atalay et al., "Texture Generation With The Random Neural Network Model", published in Proc. ICANN, 1991, pp. 111–116.

Patel et al., "A Single Layer Neural Network For Texture Discrimination", 1991 IEEE International Symposium on Circuits and Systems, Jun. 11, 1991, pp. 2657–2660.

Atalay et al., "The Random Neural Network Model For Texture Generation", International Journal of Pattern Recognition and Artificial Intelligence, vol. 6, No. 1, Apr. 1992, pp. 131–141.

Sirat et al, "Image Compression w/Competing Multilayers Perceptrons" 1989 pp. 404–405.

*Primary Examiner*—Leo Boudreau
*Assistant Examiner*—Chris Kelley
*Attorney, Agent, or Firm*—Debra K. Stephens

[57] ABSTRACT

A system (22) for synthesis of textured images, comprising a texture analyser (24) and a texture synthesizer (28). The texture analyser (24) comprises an analyzing neural network (30) which learns to characterize a texture by calculating synaptic coefficients ($C_{ab}$), utilizing at least one proximity function which characterizes a neighbourhood around pixels of said texture. The texture synthesizer (28) comprises a synthesizing neural network (40) which receives the synaptic coefficients ($C_{ab}$) thus calculated and which, utilizing a relaxation mechanism, synthesizes a replica of the texture learned. The neural networks (30), (40) may have a tree-type structure.

6 Claims, 3 Drawing Sheets

SYSTEM FOR PROCESSING TEXTURED IMAGES, TEXTURE ANALYSER AND TEXTURE SYNTHESIZER

This is a continuation of application Ser. No. 08/121,655, filed on Sep. 14, 1993 now abandoned.

FIELD OF THE INVENTION

The invention relates to a system for synthesis of textured images, comprising:

a texture synthesizer provided with a synthesizing neural network with neurons which are interconnected by links whose weights are defined by synaptic coefficients $C_{ab}$, input means for loading the synthesizing neural network with values of the synaptic coefficients $C_{ab}$ which characterize at least one pixel proximity function of a texture of an input image, means for making the synthesizing neural network operate in an autonomous manner so as to generate a statistic replica of said texture by way of a relaxation mechanism ensuring that output data of the synthesizing neural network is cyclically re-introduced at the input of said neural network.

The invention also relates to a texture analyser and a texture synthesizer.

BACKGROUND OF THE INVENTION

Texture in an image is referred to as a region presenting a homogeneous aspect to an observer. A texture may represent the same material: wood, tissue, paving, water ... with a limited number of patterns which recur according to a more or less regular or random disposition. Reconstructing a texture thus consists in presenting the eye with an image having the aspect of the initial image as well as possible, i.e. reconstruction of a statistic replica of the disposition of the texture patterns is concerned.

In order to characterize a texture it is necessary to determine its extent in advance. This operation concerns the segmentation of the texture. It serves to determine the contours bounding the extent of the texture or textures. This operation can be performed outside the system.

After determination of the contours of the texture, it is necessary to reproduce it in order to generate images used, for example in television, with a Compact Disc video, or with a videophone.

A method for coding a texture consists in determining the luminance level of a pixel on the basis of luminance levels of neighbouring pixels. In order to synthesize the texture, an iterative process is performed which successively updates luminances of pixels while optimizing a cost function. The texture thus synthesized depends on parameters coded as a function of cost. Therefore, it is necessary to minimize the number of these parameters in order to reduce the calculation times and the data transmission times for synthesizing a texture. Therefore, substantial compression of the information is desirable.

The document "Texture Generation with the random neural network model" by V. ATALAY, E. GELENBE and N. YALABIK, published in Proc. ICANN, 1991, pp. 111–116, describes a device for generating textures. The device utilizes a neural network which operates as a texture synthesizer. To this end, the neural network is loaded with synaptic coefficients which are fixed a priori by a selection performed by the user on the basis of consideration of the symmetry of the texture. The neural network determines the states of all pixels constituting the statistic replica by taking the pixels one by one and by taking into account the states of the pixels surrounding the pixel being treated. The calculation utilizes a relaxation mechanism which consists in the re-introduction of the output data of the neural network at its input terminals. After a given number of cycles, the relaxation mechanism stabilizes itself. The operation is controlled by a computer.

A device of this kind has several drawbacks. The analysis of the texture (or the coding of the texture) is performed on the basis of a selection made by the user and not by the device itself. Therefore, a device of this kind cannot execute autonomously the analysis and the synthesis of the texture, without intervention by the user. Therefore, it cannot operate dynamically and follow the evolution of the contents of the textures.

Moreover, in the cited article the operator utilizes a simple proximity function, that is to say a weighted sum of the neighbouring pixels. It is not feasible to take into account complex functions which take into account remote, diffuse, distributed etc. interactions between the pixels of an image. Actually, such a selection method quickly becomes impractical.

SUMMARY OF THE INVENTION

It is a first object of the invention to propose means for coding a texture of arbitrary complexity, and for subsequently transmitting, possibly to a remote location, compressed coded information in order to reconstruct a replica of said texture.

This object is achieved by means of a system for the synthesis of textured images which comprises:

a texture analyser provided with an analyzing neural network which learns, on the basis of examples relating to said texture which are applied to its input, to characterize said texture by calculating values of said synaptic coefficients $C_{ab}$ by utilizing at least one proximity function which characterizes a neighbourhood around the pixels constituting said texture, means for applying said synaptic coefficients $C_{ab}$ to the synthesizing neural network, the synthesizing neural network utilizing a proximity function, or functions, which is (are) identical to that (those) learned by the analyzing neural network, the synthesizing neural network generating said statistic replica of the texture of the input image on the basis of random values initially assigned to the pixels of said replica.

A system of this kind is thus capable of learning real textures, even when they are disorganized or affected by noise. It is not necessary for the system to know the texture in advance. The proximity function characterizing the texture around each pixel may be of arbitrary complexity.

After the learning of the texture, i.e. after the coding of the texture by the analyzing neural network, the network applies parameters of the texture learned, in the form of synaptic coefficients, to a synthesizer which synthesizes the texture. By transmitting the texture in the form of synaptic coefficients, an efficient compression of the information is achieved.

Preferably, the texture synthesizer receiving the synaptic coefficients is arranged in the same location as the analyser or in a remote location. In the latter case the transmission can be realised via a cable network or by radio waves.

In order to generate said statistic replica of the texture learned, the synthesizer can receive only synaptic coefficients from the analyser. It does not require any other parameter from the analyser. To this end, the synthesizing neural network utilizes the same proximity function (functions) as used by the analyser. The operation of the neural network is based on a relaxation mechanism, i.e. the output signals of the neural network are cyclically re-introduced at the input of this network.

For suitable operation the synthesizing neural network requires initial pixel states. The initial values assigned to the pixels may be chosen at random. It is also possible to choose one or more initialization pixels having positions which are distributed across the extent of the texture and whereto given initial values are assigned. The values of states and the positions of the initializing pixels can be transmitted by the analyser.

Preferably, an analyzing neural network and a synthesizing neural network having a structure organized in the form of a tree of neurons are used. The depth of the tree, i.e. the number of successive layers of neurons, may be predetermined. The number of neurons of the tree and the duration of the calculations performed by the synthesizing neural network are thus reduced. Advantageously, a single neural network in the form of a tree enables several proximity functions to be implemented.

It is also possible for the analyzing and synthesizing neural networks to have a known structure, for example a structure organized in the form of layers of neurons.

The various aspects of the invention and further aspects will become apparent from and be elucidated with respect to the embodiments described hereinafter.

BRIEF DESCRIPTION OF THE DRAWINGS

The invention will be better understood on the basis of the following Figures which are given by way of non-limitative examples; therein.

DESCRIPTION OF EMBODIMENTS

Figure 1A:
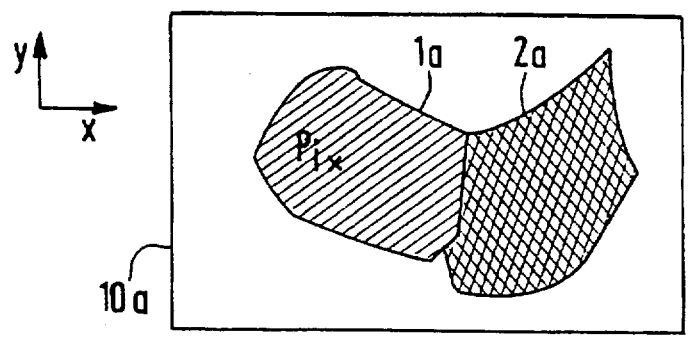
FIGS. 1A, 1B show a source image in which two textures appear and an image synthesized with a statistic replica of the textures learned.

FIG. 1A shows an image 10a comprising two zones 1a and 2a which are formed by image parts having different textures. The zone 1a has a texture formed by slanted straight lines. Generally speaking, a texture does not correspond to a perfectly defined and perfectly repetitive geometrical pattern. From a mathematical point of view, therefore, it can be described only statistically. In accordance with the invention, the texture is modelled so that this model, when implemented by the synthesizer, enables a statistic replica of the texture to be generated, which replica is sufficiently faithful to impart to the observer the same visual impression upon observation of the source texture or the statistic replica. Therefore, the aim is not to copy an identical texture but to ensure a satisfactory reproduction.

Figure 2:
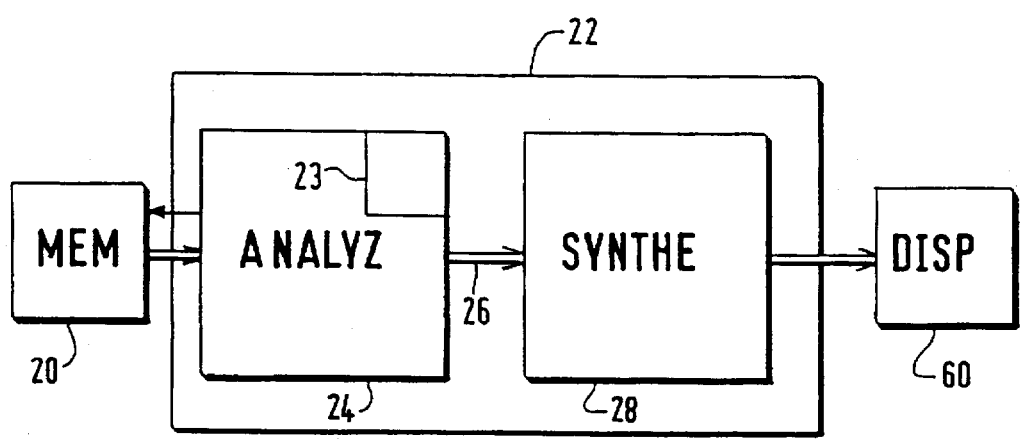
FIG. 2 shows a block diagram of a system for processing textured images in accordance with the invention.

FIG. 2 shows a block diagram of a system 22 for processing textured images in accordance with the invention. The image data to be processed are stored in an image memory 20 MEM. They may also originate from a transmission channel which continuously supplies the data. The system 22 comprises an analyser 24 ANALYZ and a synthesizer 28 SYNTHE. It is necessary to determine in advance the contours of zones having a homogeneous texture, and hence know the addresses of the pixels relating to the same zone. A contour detector 23 can be incorporated in the analyser. A zone is subsequently learned, and hence coded, by the analyser 24 which supplies the synthesizer 28, via a channel 26, with strongly compressed coded data. On the basis of this data the synthesizer generates a statistic replica of the coded texture.

An advantage of this system consists in that the channel 26 transmits coded data for which the information transmitted has been strongly compressed. A further advantage resides in the fact that at the end of the transmission of the coded data the synthesizer need not receive the state of pixels of the source texture in order to supply a statistic replica of the texture.

Therefore, a first step consists in analyzing the texture to be reproduced. This takes place in the form of a texture coding process performed in the analyser. In accordance with the invention, the analyser 24 comprises (FIG. 3) an analyzing neural network 30 NN which learns the texture by determining synaptic coefficients which thus constitute the strongly compressed coded data.

The learning mechanisms utilized in a neural network are known to a person skilled in the art and will not be elaborated herein. For suitable understanding of the invention it suffices to know that the learning by a neural network consists in presenting the input of the neural network with examples for which the neural network must output a result which is known in advance (supervised learning). This known result in advance and the result effectively output by the neural network are compared. The gaps are progressively reduced by presenting a sufficient number of examples. This is realised by updating the synaptic coefficients $C_{ab}$ utilized in the neural network. After presentation of these examples, the neural network has learned to associate the known results with the input examples, i.e. it is capable of reconstructing a pixel as a function of its neighbouring pixels. It has thus coded the texture.

Generally speaking, this knowledge is contained in the set of synaptic coefficients $C_{ab}$ characterizing the weight of each link between a neuron "a" and a neuron "b" (or an input). For the neural network to learn the texture, it operates on the basis of pixels contained in the texture. For an arbitrary pixel $P_i$ (FIG. 1A) having coordinates $x_i$, $y_i$ in the source texture, the input of the neural network is supplied with the parameter values (for example, luminance) of pixels surrounding the pixel $P_i$. These pixels are linked to the pixel $P_i$ by a proximity function. Various proximity functions can be utilized, enabling any pixel $P_i$ to be characterized. They can characterize the direct vicinity of the pixel $P_i$, for example the closest neighbours. They can also characterize a more remote environment or, generally speaking, any diffuse relationship existing between the state of a pixel and the states of other pixels of the texture. Advantageously, the use of a neural network imposes no restriction whatsoever as regards the choice of proximity functions. Any texture, even very complex textures, can thus be coded.

The synaptic coefficients thus constitute strongly compressed data which, generally speaking, contains any information of the texture. These synaptic coefficients can thus be transmitted, via a wired connection or by wireless broadcasting, to a synthesizer which may be close to or remote from the analyser. The invention is particularly interesting when the link between the analyser and the synthesizer takes advantage of the high data compression rate.

Figure 3:
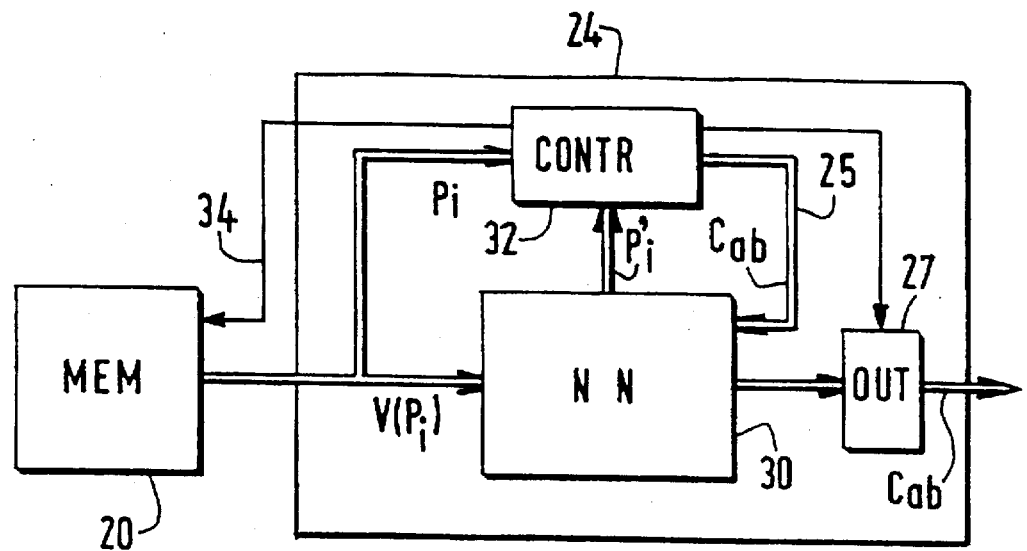
FIG. 3 shows a block diagram of a texture analyser.

FIG. 3 shows a diagram of the analyser 24 connected to the image memory 20. The analyser 24 essentially comprises an analyzing neural network 30 NN and an arithmetic device 32 CONTR. This enables determination of the contour of the textures to be coded. However, this operation can be effected outside the analyser. The extent of the texture to be coded having been determined, the arithmetic device 32 addresses (signal 34) in the memory 20, for each pixel $P_i$ of the texture, the neighbouring pixels which correspond to a predetermined proximity function $V(P_i)$.

The values of the neighbouring pixels $V(P_i)$ are applied to the neural network which calculates a state $P'_i$ so that: $P'_i = f(V(P_i), \{C_{ab}\})$, where f represents a sum of states of neighbouring pixels, weighted by the synaptic coefficients. The state $P'_i$ is compared with the state $P_i$ in the arithmetic device 32 which utilizes a known learning algorithm, for example the error backpropagation algorithm. The arithmetic device thus supplies updated synaptic coefficients $C_{ab}$ (connection 25) which are substituted in the neural network 30 for the previous synaptic coefficients. The mechanism continues until the texture has been sufficiently learned, which may become manifest as a low error rate. When the learning mechanism ceases, the texture has thus been coded in the form of synaptic coefficients stored in the analyzing neural network. They form a substantially compressed code of the texture. These synaptic coefficients can then be applied to the synthesizer by means of transmission means 27 OUT which are controlled by the arithmetic device 32.

Figure 1B:
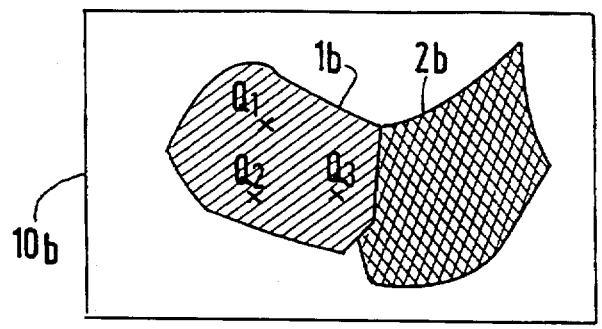
Figure 4:
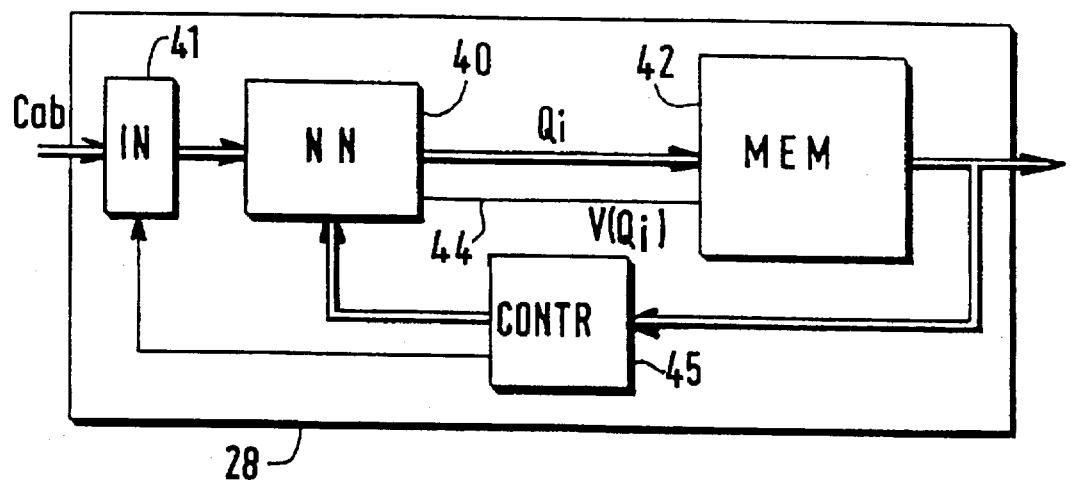
FIG. 4 shows a block diagram of a texture synthesizer.

FIG. 4 shows a diagram of the synthesizer 28. It comprises a synthesizing neural network 40 NN in which the synaptic coefficients $C_{ab}$, calculated by the analyser, are loaded via input means 41 IN. The synthesizing neural network 40 implements the same proximity function V(.) as that implemented by the analyzing neural network 30 during the preceding learning steps. The neural network 40 determines a statistic replica of the texture by calculating each pixel $Q_i$ on the basis of the proximity function $V(Q_i)$ and values of said neighbouring pixels (FIG. 1B).

The method consists in allowing only the neural network to evolve under the influence of the interactions $(Q_i, V(Q_i))$. To this end, a pixel $Q_i(t)$ is chosen at an instant t and its state $Q_i(t+1)$ at the instant t+1 is calculated. This can take place:

either synchronously: the states of all pixels (Q(t+1)) are calculated as a function of the proximities V(Q(t)), implying the storage of two complete sets of states, or asynchronously: each state Q(t) is successively updated, thus providing a complete updated set {Q(t+1)} when all pixels have been subjected to the treatment.

In order to initialize the calculation, values chosen at random can be assigned to all pixels initially forming the statistic replica. As an alternative, the calculation can also be initialized by imparting the values transmitted by the analyser to some pixels constituting the texture. In the latter case the synthesizer can reach a stable state more quickly. Each pixel $Q_i$ is thus calculated, after which it is stored in an image memory 42 which itself supplies a proximity for a new pixel $Q_i$ upon request (signal 44) by the neural network 40. Thus, using a converging mechanism which is referred to as a relaxation mechanism, the neural network calculates all states of the pixels forming the texture and converges to a stable statistic replica of the texture. In order to obtain this statistic replica, pixels can be recalculated several times. The synthesizer 28 comprises an arithmetic device 45 which controls the operation of the neural network 40, the memory 42 and the input means 41.

At the end of the process, the values of the pixels contained in the image memory 42 can be read so as to be applied to an appropriate display or processing device DISP 60 (FIG. 2).

The analyzing and synthesizing neural networks 30 and 40 may have a known architecture, for example a multi-layer architecture or a tree-type architecture. The latter is described, for example in European Patent Application EP 0 446 084. It is of particular interest because for a given pixel several proximity functions $V_1(P), V_2(P), \ldots$, located at different texture locations, can be used.

Figure 5:
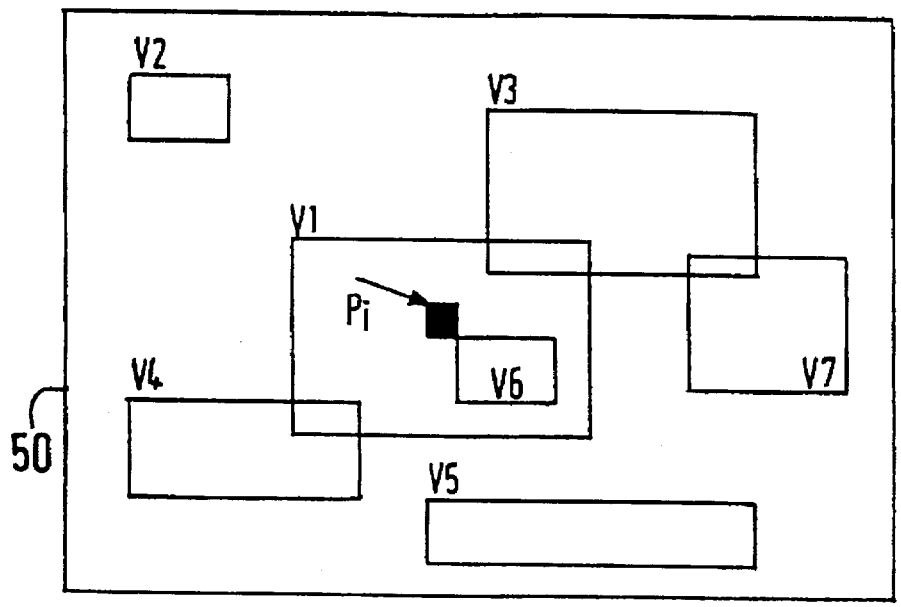
FIG. 5 shows a texture containing zones with different proximity functions.
Figure 6:
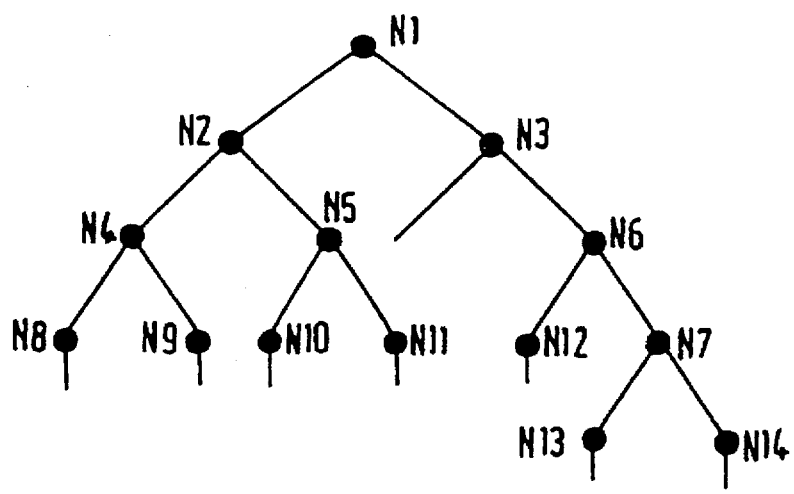
FIG. 6 shows an architecture of a tree-type neural network.

FIG. 5 shows a zone 50 of a texture. The calculation of the state of the pixel $P_i$ is performed as follows, utilizing the tree-type neural network shown in FIG. 6. A neuron N1 is defined whose input receives the states of the neighbouring pixels $V_1$. Depending on the value of the output of the neuron $N_1$ (for example, its sign), either the neuron N2, carrying the states of the neighbouring pixels $V_2$ at its input, or the neuron N3 carrying the states of the neighbouring pixels $V_3$ at its input, is activated. This mechanism continues for the subsequent neurons along each branch of the decision tree. This mechanism is described in European Patent Application EP 0 446 084. Each branch terminates with terminal neurons $N_8$ to $N_{14}$, one of which delivers the value of the pixel $P_i$. The operation of such a tree-type neural network approaches the functioning of a human observer while analyzing a scene or a texture by successive observations at different locations.

We claim:

1. A system for synthesis of textured images formed by pixels constituting said texture, comprising:

(a) a texture analyzer comprising:
        (i) an analyzing neural network having an input for receiving examples of a textured image and operative to characterize from the examples received said textured image by calculating a set of synaptic coefficients utilyzing at least one proximity function which characterizes a neighborhood around each of the pixels constituting said textured image, said set of synaptic coefficients constituting a compressed information coding of and alone representing said textured image, (b) a synthesizing neural network having an input and an output and having neurons that are interconnected by links whose weights are defined by synaptic coefficients, (c) means for communicating only the set of synaptic coefficients calculated by the texture analyzer to the synthesizing neural network, (d) said synthesizing neural network being operative in an autonomous manner to generate a statistical replica of said textured image by way of a relaxation mechanism and the cyclical re-introduction of data from its output to its input, said synthesizing neural network, in generating the statistical replica of said textured image, using the set of synaptic coefficients received from the texture analyzer and utilizing a proximity function or functions identical to that or those used by the texture analyzer on the basis of random values initially assigned to pixels in said replica.

2. A texture analyzer for use in a system for synthesis of textured images formed by pixels constituting said texture, said texture analyzer comprising an analyzing neural network having an input and an output, said analyzing neural network input for receiving examples of a textured image and being operative to characterize from the examples received said textured image by calculating a set of synaptic coefficients utilizing at least one proximity function which characterizes a neighborhood around each of the pixels constituting said textured image, said set of synaptic coefficients constituting a compressed information coding of said textured image, means for providing at the analyzing neural network output said set of synaptic coefficients calculated by the texture analyzer and alone representing the textured image analyzed for use by the system.

3. A texture synthesizer for use in a system for synthesis of textured images formed by pixels constituting said texture, said texture synthesizer comprising a synthesizing neural network having an input and an output and having neurons that are interconnected by links whose weights are defined by synaptic coefficients, said synthesizing neural network input for receiving only a set of synaptic coefficients based on calculations utilizing at least one proximity function which characterizes a neighborhood around each of the pixels constituting a textured image being analyzed, which set of synaptic coefficients alone represents the textured image analyzed, said synthesizing neural network being operative in an autonomous manner to generate a statistical replica of said textured image by way of a relaxation mechanism and the cyclical re-introduction of data from its output to its input, said synthesizing neural network, in generating the statistical replica of said textured image, using the set of synaptic coefficients received at its input and utilizing a proximity function or functions identical to that or those used to calculate the set of synaptic coefficients received on the basis of random values initially assigned to pixels in said replica.

4. A system as claimed in claim 1, characterized in that the synthesizing neural network (40) and the analyzing neural network (30) have a hierarchic structure in the form of a tree of neurons.

5. A system as claimed in claim 1, characterized in that initialization pixels of the statistical replica (1$b$) (2$b$) are applied to the synthesizer (28) by the analyser (24).

6. A system as claimed in claim 4, characterized in that the hierarchical structure in the form of a tree of neurons has a given depth of the tree.

* * * * *